[11] 3,617,781

[72] Inventor Richard J. Rosa
     Reading, Mass.
[21] Appl. No. 844,582
[22] Filed July 24, 1969
[45] Patented Nov. 2, 1971
[73] Assignee Avco Corporation
     Cincinnati, Ohio

[54] METHOD OF PREVENTING MATERIAL BUILDUP IN ELECTRODES IN MHD DEVICES
     2 Claims, 4 Drawing Figs.
[52] U.S. Cl. .................................................. 310/11
[51] Int. Cl. ................................................ H02m 4/02
[50] Field of Search............................................ 310/10, 11;
                                        103/1 M; 73/194 EM

[56] References Cited
     UNITED STATES PATENTS
     2,896,451  7/1959  Rinia .............................. 73/194
     3,210,642 10/1965  Rosa .............................. 321/49

Primary Examiner—D. X. Sliney
Attorneys—Charles M. Hogan and Melvin E. Frederick ABSTRACT: Prevention of buildup of material on the cathodes and anodes in direct current magnetohydrodynamic devices which would otherwise occur is substantially reduced if not prevented by providing periodic current reversal in the electrodes. Such current reversal may be achieved in accordance with the invention by providing electrode segments around the periphery of the channel, maintaining a fixed relationship between magnetic field and means coupling appropriate electrode segments to the load and rotating the channel.

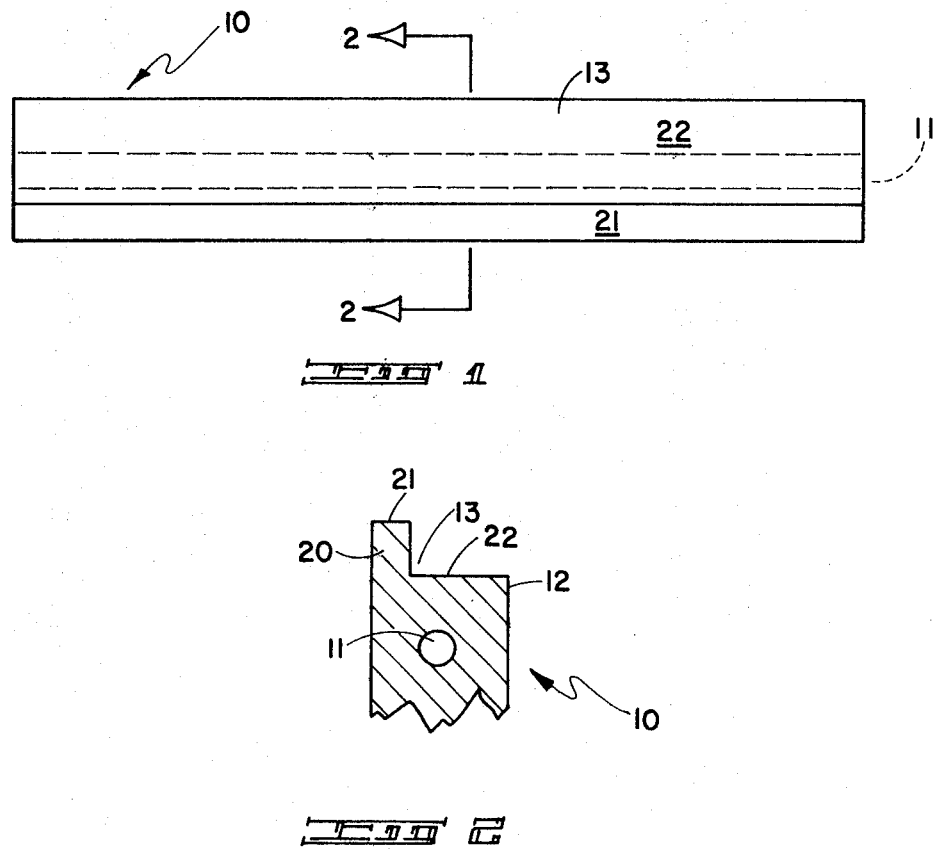
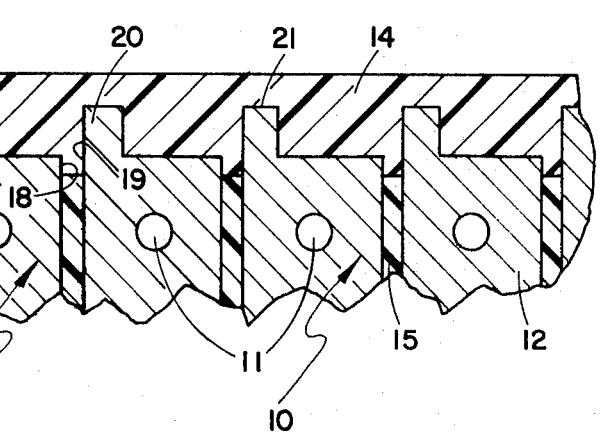

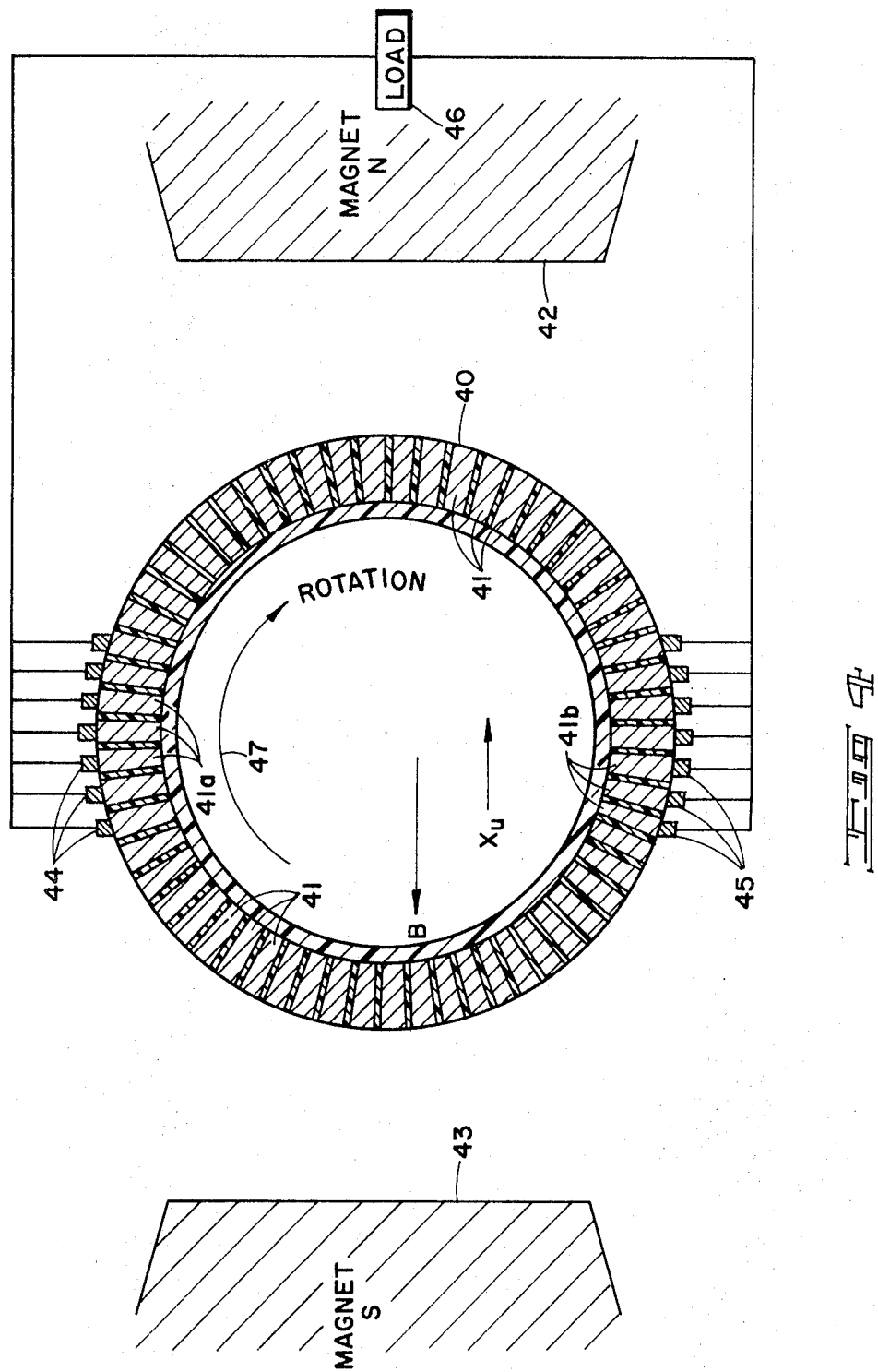

METHOD OF PREVENTING MATERIAL BUILDUP IN ELECTRODES IN MHD DEVICES

The present invention relates generally to the operation of magnetohydrodynamic (hereinafter referred to as "MHD") devices employing a hot electrically conductive fluid or plasma, and more particularly to a method of preventing material buildup in electrodes in MHD devices.

MHD generators produce electric power by movement of electrically conductive fluid or plasma relative to a magnetic field. The plasma employed is usually an electrically conductive gas from a high temperature, high pressure source. From the source, the plasma flows through the generator and by virtue of its movement relative to the magnetic field, induces an electromotive force between opposed electrodes within the generator. The gas comprising the plasma may exhaust to a sink which may simply be the atmosphere; or, in more sophisticated systems, the gas may exhaust to a recovery system including pumping means for returning the gas to the source. Conductivity of the gas may be produced thermally and/or by seeding with a substance that ionizes readily at the operating temperature of the generator. For seeding purposes, sodium, potassium, cesium or an alkali metal vapor may be used. Regardless of the gas used, or the manner of seeding, the resulting gases comprise a mixture of electrons, positive ions, and neutral atoms which, for convenience, is termed "plasma."

An MHD generator of the type described normally employs a stationary magnetic field and unidirectional gas flow. As a result, such a generator is inherently a source of direct current. If alternating current is desired, some form of auxiliary equipment is usually provided to invert the direct current to alternating current.

MHD pumps use the DC motor principle, i.e., a conductive fluid is considered to be a wire or conductor suspended in a magnetic field and has a current passed through it mutually perpendicular to the length of the conductor and the magnetic field. Under these conditions, a force is induced in the conductor which tends to move it in a direction which is mutually perpendicular to the current and magnetic flux. This force, when applied to a liquid conductor, propels the liquid conductor in the same manner as a conventional pump. Such pumps have become quite common in laboratory work and in connection with the movement of liquid sodium and liquid sodium-potassium in nuclear reactors. Electrodes for passing electric current through the liquid conductor within the magnetic field are located in what is generally referred to as the throat of the pump.

MHD accelerators are constructed and operate in substantially the same manner as MHD pumps, the difference being that whereas MHD pumps are generally used for pumping liquids, MHD accelerators are generally used for accelerating an electrically conductive gas.

For a more thorough discussion of MHD generators, reference is made to U.S. Pat. No. 3,264,501 which issued Aug. 2, 1966.

For a more thorough discussion of rotation of MHD magnets and/or generators, reference is made to U.S. Pat. No. 3,210,642, and for a more thorough discussion of MHD electrodes, reference is made to U.S. Pat. No. 3,406,300.

The principal object of the present invention is to prevent the buildup of material in the electrode structure of MHD devices.

Another object of the present invention is the prevention of electrode failure due to material buildup on electrodes in direct current MHD devices.

A further object of the present invention is a prevention of structural failure and electrode shorting in electrodes in direct current MHD devices.

The novel features that are considered characteristic of the present invention are set forth in the appended claims; the invention itself, however, both as to its organization and method of operation, together with additional objects and advantages thereof, will best be understood from the following description when read in conjunction with the accompanying drawings, in which:

FIG. 1 is a top view of a base member forming part of an MHD electrode;

FIG. 2 is a partial end view taken on line 2—2 of FIG. 1;

FIG. 3 is a sectional end view of electrodes in an MHD device; and

FIG. 4 is a simplified diagrammatic illustration and sectional end view of an MHD generator for carrying out the invention.

FIGS. 1, 2 and 3 illustrate a typical electrode structure for MHD devices. As best shown in FIGS. 1 and 2, the electrode may be comprised of a metallic base member 10, such as for example copper, provided with a passage 11 to receive a coolant, an end portion 12 provided with a groove or recess 13 extending over the length of the member. The groove or recess 13 is filled with a semiconductor material 14 (shown in FIG. 3) more fully described below.

When mounted in an MHD device, the electrodes must of course be electrically insulated one from another to prevent short circuiting. Pressure-bearing insulating material 15, such as Teflon, cork, rubber, or the like, may be provided at the low temperature regions and at the bottom surface (not shown) remote from the gas and a refractory material (or the semiconductor material 14 shown in FIG. 3), such as for example alumina, magnesia, silica, and zircon, provided between the upper portions of the side surfaces 18 and 19 of adjacent members. A suitable refractory material should be electrically nonconducting at the average temperature of the duct walls, it should not form low temperature melting mixtures or chemically react with the materials used to fabricate the duct walls, it should be able to withstand thermal stress and shocks at temperatures characteristic to MHD devices, and it should be chemically inert with combustion products.

Present day electrically conductive gases or plasmas used in MHD devices are either noble gases heated to a temperature of at least 2,000° F. or more, or products of combustion at a temperature of about 5,000° F. Accordingly, an electrode in accordance with the present invention intended for use in MHD devices in any event must be exposed to temperatures in excess of 2,000° F. that may vary over a considerable range and most likely exposed to a corrosive and/or oxidizing plasma. Under these conditions, it has been found that a semiconductor material is most suitable. The semiconductor material may be doped with an electrically emissive material for emitter electrodes.

Whether of a refractory nature or not, the material deposited in grooves 13 (see FIG. 1) should not be oxidizable when exposed to the electrically conductive gas, and it should have a low coefficient of expansion to prevent or at least minimize cracking, spalling and the like.

The electrical conductivity of the semiconductor material here concerned is a function of temperature. Thus, for a given electrically conductive gas or plasma and electrode design, the temperature of the exposed surface of the semiconductor material depends on the gas temperature gradient in the boundary layer and since the conductivity of gases is strongly dependent on temperature, the Joule dissipation in the boundary layer is dependent on the temperature of the boundary layer. Further, for many applications the electrically conductive gas used in MHD devices reacts with and, therefore, consumes electrode refractory materials such as carbon, tungsten, molybdenum, columbium, and the like.

Material that has been found satisfactory is described in an article entitled, "Properties and High Temperature Applications of Zirconium Oxide" in Ceramic Age, June, 1962. This material is zirconium oxide with about 6.4 mole percent calcium oxide. While such a material serves equally as well in an inert atmosphere as in an oxidizing atmosphere, other materials, such as for example zirconium diboride or zirconium nitride, without additives, or perhaps refractory ceramics doped with either barium oxide or calcium oxide and the like, may be used in an inert or nonoxidizing atmosphere.

By way of example, for thermally emissive electrodes, a suitable level of thermal emission is of at least the order of 1 ampere per square centimeter required in MHD generators and one hundred amperes per square centimeter required in MHD accelerators. As noted previously, zirconium oxide doped with 6.4 mole percent calcium oxide will provide satisfactory electrical characteristics.

Cooling of the metallic portion of the electrode 10 is required for continuous operation of long duration and particularly when the electrically conductive gas is at about 5,000° F. as is the case for a suitable electrically conductive gas comprised of products of combustion. Typically, with cooling, the metallic portion of the electrode may be maintained at a temperature of only 500° F. The metallic portion 10 of the electrode may be of any suitable metal, such as for example copper, nickel or steel. As compared to an electrode having a metallic portion composed of copper or the like, nickel or steel can be used where it is desired to employ a coolant which operates at high temperature and high pressure, such as water, at 400° F. and 1,000 p.s.i.

The semiconductor material may be conveniently deposited in the grooves or recesses by troweling, firing, or by the plasma spraying technique. However, it is to be understood that the type of grooves shown and described may vary widely as many types of cavities may be used to suitably retain the semiconductor material. Thus, if there is no Hall potential or it is small, the electrode grooves may be disposed parallel to the direction of gas flow.

A suitable depth and width of the recesses are essentially determined by the thermal characteristics of the semiconductor material. The depth and width of the recesses are advantageously selected in a manner to provide the desired surface temperature of the semiconductor material in the recess which results in maximum electrical conductivity and, hence, minimum electrode drop for the particular material that is selected. The optimum temperature will of course be determined by the composition of the material that is selected. By way of example, a temperature of about 3,640° F. at a portion of the exposed surface of zirconia has been found to be satisfactory.

Attention is now particularly directed to the relatively narrow projection 20 formed by the provision of the two-sided groove 13. It will be seen from an inspection of FIG. 3 that the end portion 12 of each member proximate the gas is comprised of a first end surface 21 and a second larger end surface 22 spaced further from the gas or exposed surface 23 of the semiconductor material than the first mentioned first end surface 21. The dimension of the end portions 12 of each member proximate the gas is preferably small in the direction of gas flow (from left to right for example in FIG. 3) compared to the dimension of the members normal to the direction of gas flow. Accordingly, the thickness of the semiconductor material covering each projection 20 (or surface 21) is less than the thickness of the semiconductor material covering the balance of each member (or surface 22). Because of the high thermal conductivity of the metallic member including projection 20 as compared to that of the semiconductor material, the temperature at the surface 23 of the semiconductor material over the second or more remote surfaces 22 will approach that of the gas, whereas the temperature of the semiconductor material over the projections or surfaces 21 will be substantially less. As will now be obvious, the thickness of the semiconductor material over the projections 20 may be easily selected to provide a temperature throughout this region that is less than that at which the semiconductor material is electrically conductive, thereby providing a high impedance zone between the semiconductor material covering adjacent members. The temperature of the exposed surface 23 of the semiconductor material over the second surface 22 approaches that of the gas and, hence, is electrically conductive.

The depth or thickness of the semiconductor material over the second surface must be optimized since shallow grooves cause the semiconductor material to run too cold and, thereby, lead to poor performance. Alternately, while very deep grooves increase the electrical conductivity of the semiconductor material, such grooves cause the semiconductor material to run too hot and, thereby, lead to erosion of the electrode and increased pressure drop. In actual tests, groove 0.10 inch deep (normal to the direction of gas flow) and 0.20 inch wide (in the direction of gas flow) were found satisfactory for a heat flux of $0.75 \times 10^6$ B.t.u./hr./ft.$^2$. A good rule of thumb for selecting a groove width is that the groove width should be between one to two times the groove depth. Theory is available to select satisfactory widths for the projections 20 as well as groove depths for given heat transfer rates. In practice, it is desirable to make the width of the base members 10 as small as practically possible so that the maximum number of electrodes can be used. In the aforementioned actual tests, an electrode drop of about 18 volts was measured when semiconductor material comprising zirconia in a groove 0.10 inch × 0.20 inch ranged in temperature between 3,320° F. and 3,410° F. whereas at 3,640° F. to 3,720° F. the electrode drop was about 12 volts.

As will now be evident, the semiconductor material as shown in FIG. 3 functions to provide a stable, smooth and continuous surface wherein alternate spaced portions function as electrically conductive electrodes to permit the conduction of current in a direction normal to the direction of gas flow and the portions of the same material intermediate the alternate spaced portions functions as electrically nonconductive insulators and prevents the conduction of current in a direction parallel to the direction of gas flow, i.e., the material intermediate the alternate electrically conductive portions provides high impedance zones which at least substantially prevent the flow of current parallel to the direction of gas flow between the semiconductor material covering adjacent members.

Materials used for electrodes of the type described hereinabove, such as various ceramics and slags, tend to be ionic conductors in which current is carried by migrating ions. Where the ions are metal, such as for example alkali or alkaline earth metals and are positively charged, the flow of current in the electrodes tends to cause the metal ions to plate out at the uppermost surfaces 21 and/or 22 of the metallic portions 10 on the cathode side in the case of a generator and at the exposed surface 23 on the anode side. The overall accumulation over a period of hours may be appreciable. For example, at a typical current density of about 1 ampere/cm.$^2$ a layer so formed has been found to grow at the rate of about 3 millimeters per hour. Such a growth rate eventually leads to structural and/or electrical shorting problems. However, this problem may be avoided in MHD devices having electrodes of the general type described hereinabove in accordance with the invention by reversing the direction of current flow in the electrodes. This reversal of current flow may be practically obtained, for example, by rotating the channel. This may be accomplished, for example, as diagrammatically illustrated in FIG. 4 where there is shown a channel 40 including electrode segments 41 disposed around the periphery of the channel 40. A magnetic field is provided by suitable means represented by magnets 42 and 43. The magnetic field is designated by the arrow B. A plurality of oppositely disposed electrode segments as, for example segments 41a and 41b, are coupled through conventional sliding contacts 44 and 45 in conventional manner to a load 46. Rotation of the channel in conventional manner is designated by the arrow 47. The rate of rotation is very slow, such as for example one revolution per minute to one revolution per hour. With such a slow rate of rotation where the channel rather than the magnet is rotated, conventional gas seals may be easily provided. However, where the generator is not used continuously, as in the case of a peaking generator, the channel may be quickly rotated to provide electrode current reversal. For a more thorough discussion of the rotation of MHD magnets and/or channels, reference is made to the aforementioned U.S. Pat. No. 3,210,642.

While U.S. Pat. No. 3,210,642 is principally concerned with rotation of MHD devices to provide alternating current and, hence, the relation of the conducting anodes and cathodes to the magnetic fields varies to provide a continuously varying sign wave of current and voltage at the cathodes and anodes in accordance with the present invention the relation of the conducting electrodes to the magnetic field remains the same—only the role of the electrode as an anode or a cathode is changed.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In the method of operating a direct current MHD device comprising a source of conducting fluid, a channel connected to said source, a plurality of pairs of electrodes disposed on nonparallel axes transverse of said channel, means to establish a magnetic field transversely of said channel and surrounding said electrodes, and means coupling an opposed pair of said electrodes to a load, the steps comprising:
   a. providing metal ions in said fluid;
   b. maintaining the electrodes coupled to said load substantially normal to the direction of said magnetic field; and
   c. periodically reversing the direction of current flow in said electrodes whereby said electrodes function cyclically first as an anode and then as a cathode for periods of time in the range of about 1 minute to 1 hour.

2. The method as defined in claim 1 wherein said duct is rotated.

* * * * *